(12) United States Patent
Holland et al.

(10) Patent No.: US 12,459,735 B2
(45) Date of Patent: Nov. 4, 2025

(54) APPARATUS, SYSTEM, AND METHOD FOR AUTOMATING PARTS DELIVERY

(71) Applicant: Toyota Motor Engineering & Manufacturing North America, Inc., Plano, TX (US)

(72) Inventors: Lloyd R. Holland, Georgetown, KY (US); Scottie L. Foster, Lawrenceburg, KY (US); Bradley J. Garcia, Louisville, KY (US); Michael C. Greenlee, Paris, KY (US); Jeffrey L. James, Mount Sterling, KY (US); Annetta L. Allen, Trenton, MI (US); Ronnie G. Kiser, Jr., Lexington, KY (US); Andrew B. Novian, Winchester, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 344 days.

(21) Appl. No.: 18/122,660

(22) Filed: Mar. 16, 2023

(65) Prior Publication Data
US 2024/0308764 A1   Sep. 19, 2024

(51) Int. Cl.
*B65G 1/08* (2006.01)
*B65G 1/04* (2006.01)
*B65G 43/08* (2006.01)

(52) U.S. Cl.
CPC ............. *B65G 1/0492* (2013.01); *B65G 1/08* (2013.01)

(58) Field of Classification Search
CPC ........ B65G 1/0492; B65G 1/08; B65G 1/065; B65G 43/08; B65G 47/8815
(Continued)

(56) References Cited

U.S. PATENT DOCUMENTS

| | | | | |
|---|---|---|---|---|
| 3,458,023 A | * | 7/1969 | Kramer | B65G 47/8815 193/35 R |
| 4,088,221 A | * | 5/1978 | Bowser | B65G 47/8815 198/780 |

(Continued)

FOREIGN PATENT DOCUMENTS

| | | |
|---|---|---|
| CN | 205604793 U | 9/2016 |
| CN | 110282398 A | 9/2019 |

(Continued)

OTHER PUBLICATIONS

Europa Systems SP. Z O.O., "Lifting Conveyor", retrieved from https://europasystems.com/product-eng-39-Liftingconveyor.html, Jun. 22, 2022, 4 pages, Pyrzyce.

*Primary Examiner* — Douglas A Hess
(74) *Attorney, Agent, or Firm* — Snell & Wilmer LLP

(57) ABSTRACT

Apparatuses, systems, and methods for delivering a part to another system. An apparatus includes a platform. The platform includes a plurality of holding stations configured to hold a plurality of parts to be delivered to another system. The plurality of holding stations include at least a first holding station and a second holding station. The apparatus further includes a first gate member and a second gate member. The first gate member is coupled to the first holding station and a first engaging member and is configured to move to an open position when the first engaging member is engaged with a first guide member coupled to another apparatus. The second gate member is coupled to the second holding station and a second engaging member and is configured to move to an open position when the second engaging member is engaged with a second guide member coupled to another apparatus.

20 Claims, 14 Drawing Sheets

(58) Field of Classification Search
USPC .......................................................... 193/35 G
See application file for complete search history.

(56) References Cited

U.S. PATENT DOCUMENTS

| | | | | |
|---|---|---|---|---|
| 5,641,161 | A * | 6/1997 | Freudelsperger | ........ B65G 1/08 |
| | | | | 271/103 |
| 6,692,211 | B2 | 2/2004 | Yuyama et al. | |
| 9,321,591 | B2 * | 4/2016 | Lert | ..................... B65G 1/1373 |
| 9,409,711 | B1 * | 8/2016 | Hanssen | ................. B65G 37/00 |
| 9,499,338 | B2 * | 11/2016 | Toebes | ................. B65G 1/0492 |
| 9,561,905 | B2 * | 2/2017 | Toebes | ................. B65G 1/0492 |
| 10,399,772 | B1 * | 9/2019 | Brazeau | ............... B65G 1/0492 |
| 10,569,957 | B2 | 2/2020 | Nakamoto et al. | |
| 10,882,703 | B2 | 1/2021 | Phillips et al. | |
| 11,078,017 | B2 * | 8/2021 | Toebes | ................. B65G 1/0492 |
| 11,339,001 | B2 * | 5/2022 | Suemichi | ............. G01G 19/393 |
| 11,597,610 | B2 * | 3/2023 | Dörr | ....................... B65G 1/08 |
| 2021/0039887 | A1 * | 2/2021 | Zhu et al. | |

FOREIGN PATENT DOCUMENTS

| | | | | |
|---|---|---|---|---|
| CN | 213171326 U | 5/2021 | | |
| CN | 216104622 U | 3/2022 | | |
| EP | 2876060 A1 | 5/2015 | | |
| WO | WO-2016172253 A1 * | 10/2016 | ............. | B07C 3/087 |

* cited by examiner

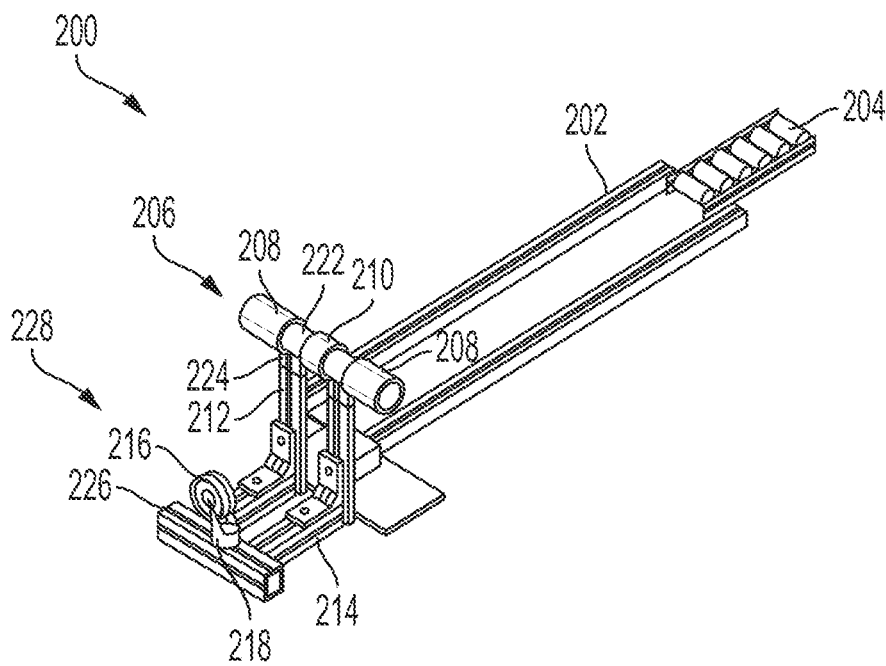
FIG. 2A
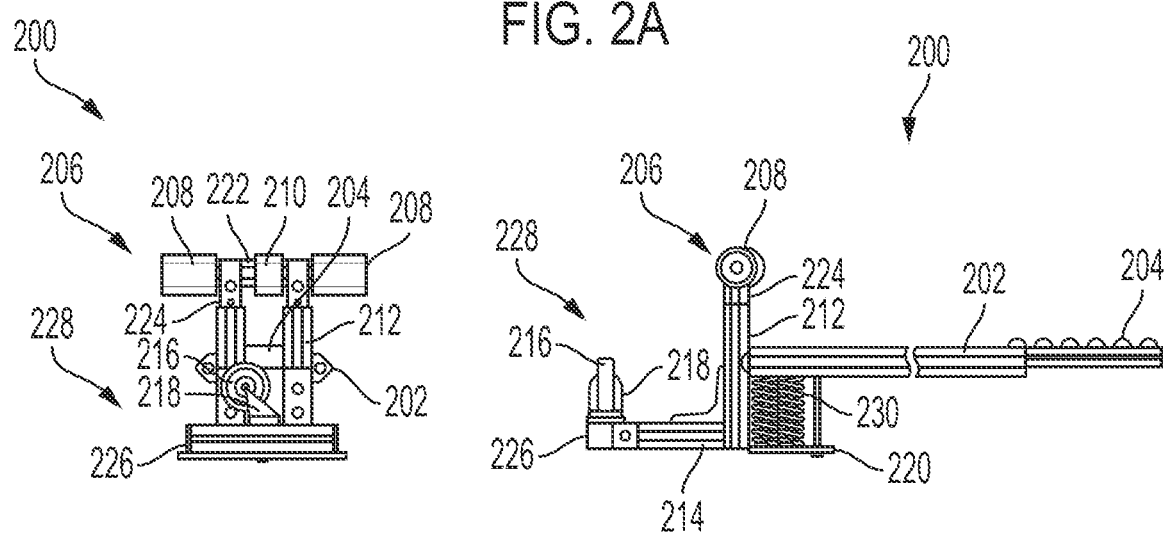
FIG. 2B
FIG. 2C

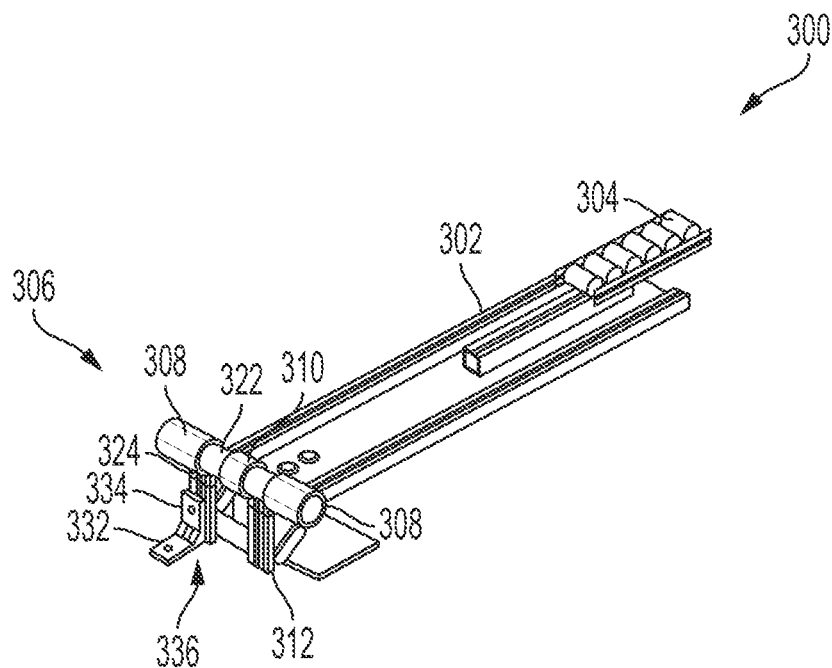
FIG. 3A
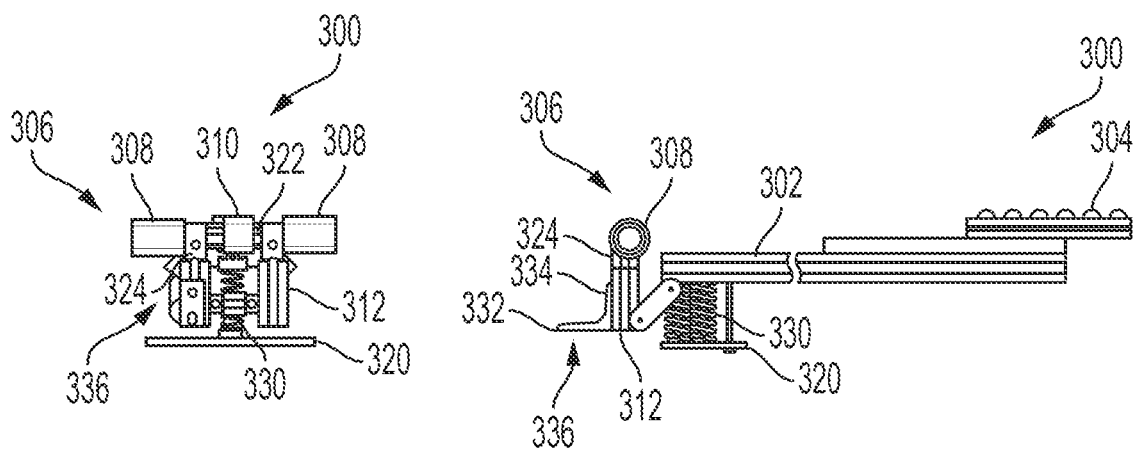
FIG. 3B
FIG. 3C

APPARATUS, SYSTEM, AND METHOD FOR AUTOMATING PARTS DELIVERY

BACKGROUND

Field

The present disclosure relates to apparatuses, systems, and methods for automating parts delivery.

Description of the Related Art

In manufacturing plants (such as, e.g., auto manufacturing plants), delivery of a part from one area, system, apparatus, or device to another area, system, apparatus, or device can conventionally involve using one or more electrically controlled apparatuses, systems, or devices. For example, such electrically controlled systems may utilize hydraulic members and/or electric motors to unload a part (e.g., a fuel tank) from a dolly to a lifter—as but one example, an electrically controlled robotic arm may be used to move the part from the dolly to the lifter. However, such electrically controlled systems are expensive and include many points of failure (because of their complexity) requiring their own maintenance (costing even more resources).

Hence, there is a need for apparatuses, systems, and methods to more efficiently (i.e., at a lower cost and/or a shorter time frame) deliver a part from one area, system, apparatus, or device to another area, system, apparatus, or device.

SUMMARY

Described herein is an apparatus for delivering a part to another system. The apparatus includes a platform including a plurality of holding stations configured to hold a plurality of parts to be delivered to another system. The plurality of holding stations may include at least a first holding station configured to hold a first part and a second holding station configured to hold a second part. The apparatus may also include a first gate member coupled to the first holding station and a first engaging member configured to engage with a first guide member coupled to another apparatus. The first gate member may be configured to move to an open position and release the first part when the first engaging member is engaged with the first guide member on another apparatus. The apparatus may further include a second gate member coupled to the second holding station and a second engaging member configured to engage with a second guide member coupled to another apparatus. The second gate member may be configured to move to an open position and release the second part when the second engaging member is engaged with the second guide member on another apparatus.

Also described is a system for delivering a part to another system. The system includes a platform including a plurality of holding stations configured to hold a plurality of parts to be delivered to another system. The plurality of holding stations may include at least a first holding station configured to hold a first part and a second holding station configured to hold a second part. The system may also include a first gate member coupled to the first holding station and a first engaging member configured to engage with a first guide member coupled to another apparatus. The first gate member may be configured to move to an open position and release the first part when the first engaging member is engaged with the first guide member on another apparatus. The system may further include a second gate member coupled to the second holding station and a second engaging member configured to engage with a second guide member coupled to another apparatus. The second gate member may be configured to move to an open position and release the second part when the second engaging member is engaged with the second guide member on another apparatus.

Moreover, also described is a method for delivering a part from an apparatus to another apparatus. The method includes providing a platform including a plurality of holding stations configured to hold a plurality of parts to be delivered to another system. The plurality of holding stations may include at least a first holding station configured to hold a first part and a second holding station configured to hold a second part. The method may also include engaging, via a first engaging member, with a first guide member coupled to another apparatus. The first engaging member may be coupled to a first gate member connected to the first holding station. The first gate member may be configured to move to an open position and release the first part in response to the first engaging member being engaged with the first guide member on another apparatus. The method may further include engaging, via a second engaging member, with a second guide member coupled to another apparatus. The second engaging member may be coupled to a second gate member connected to the second holding station. The second gate member may be configured to move to an open position and release the second part in response to the second engaging member being engaged with the second guide member on another apparatus.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 2A is an illustration of a perspective view of a portion of a part holding station on an apparatus for delivering a part to another system according to an embodiment of the present invention;

FIG. 2B is an illustration of a front view of a portion of a part holding station on an apparatus for delivering a part to another system according to an embodiment of the present invention;

FIG. 2C is an illustration of a side view of a portion of a part holding station on an apparatus for delivering a part to another system according to an embodiment of the present invention;

FIG. 3A is an illustration of a perspective view of a portion of a part holding station on an apparatus for delivering a part to another system according to an embodiment of the present invention;

FIG. 3B is an illustration of a front view of a portion of a part holding station on an apparatus for delivering a part to another system according to an embodiment of the present invention;

FIG. 3C is an illustration of a side view of a portion of a part holding station on an apparatus for delivering a part to another system according to an embodiment of the present invention;

DETAILED DESCRIPTION

Figure 1A:
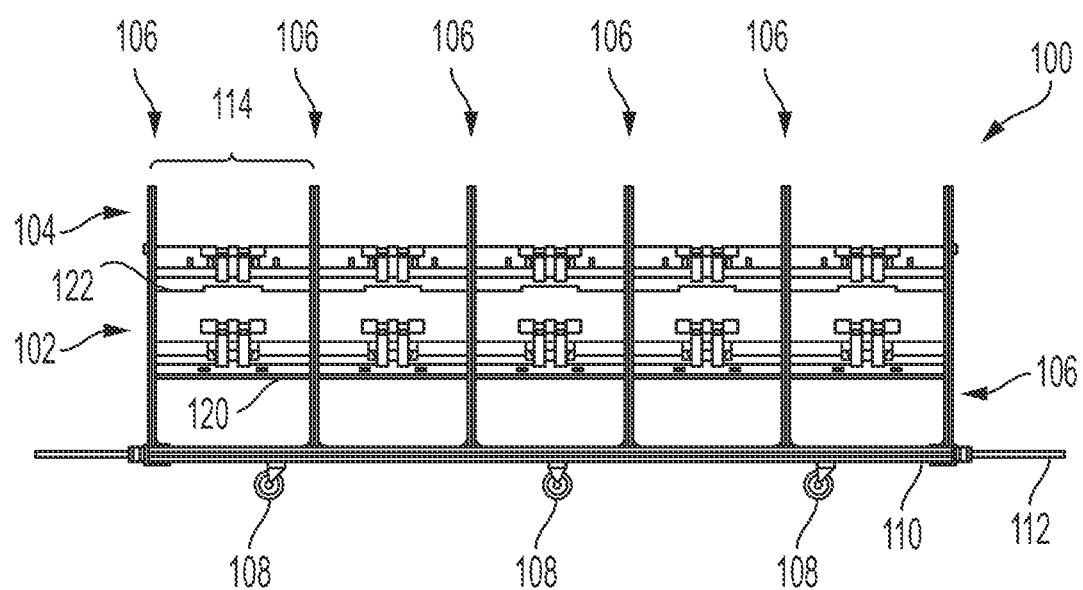
FIG. 1A is an illustration of an apparatus for delivering a part to another system according to an embodiment of the present invention.

The present disclosure describes apparatuses, systems, and methods for automating parts delivery. These apparatuses, systems, and methods provide many benefits and advantages including eliminating, e.g., electric motor(s) and/or pneumatic cylinder(s) on a dolly and instead utilizing, e.g., a plurality of spring-loaded tilt levers and gravity to deliver a part from the dolly to a lifter. The apparatuses, the systems, and the methods described herein may reduce the number of operators required to operate and/or maintain a system for delivering the part from the dolly to the lifter. This reduces the cost and increases the efficiency for delivering the part(s) from the dolly to the lifter.

Turning to FIGS. 1A-1F, a part delivery apparatus 100 is described. The part delivery apparatus 100 (also referred to herein as a dolly or a platform) includes at least a plurality of first level (e.g., lower level) holding stations 102, a plurality of second level (e.g., upper level) holding stations 104, a plurality of dividers 106, a plurality of wheels 108, a base 110, and a connector 112.

As shown in FIG. 1A, a pair of dividers 106 (or portions of the pair of dividers 106) each forming a 90 degree angle with a first level base 120 (or a portion of the first level base 120) form a first level holding station 102, and a pair of dividers 106 (or portions of the pair of dividers 106) each forming a 90 degree angle with a second level base 122 (or a portion of the second level base 122) form a second level holding station 104. A first level holding station 102 and a second level holding station 104 disposed immediately above the first level holding station 102 form a holding station group 114. As but one example, the part delivery apparatus 100 (e.g., a delivery dolly) may be approximately 16 feet long and configured to hold ten (10) fuel tanks on two (2) levels of five (5) holding stations. While two (2) levels of holding stations are illustrated in, e.g., FIG. 1A, it would be apparent to one of ordinary skill in the art that various levels (e.g., three, four, five, etc.) of holding stations as well as various holding station groups (e.g., one, two, three, etc.) may be included in the part delivery apparatus 100 without departing from the spirit of the present disclosure.

The base 110 may be disposed below the plurality of first level holding stations 102 and the plurality of second level holding stations 104, connected to the plurality of dividers 106, and connected to the plurality of wheels 108 which enable the part delivery apparatus 100 to be moved. For example, the part delivery apparatus 100 may be moved by another apparatus which may be, e.g., propelled by a motor. An example of such apparatus to move the part delivery apparatus 100 may be an automated guide vehicle (AGV) which may securely couple to the connector 112 on the part delivery apparatus 100. The part delivery apparatus 100 may be pulled or pushed by the AGV or the like via the connector 112, e.g., in a guided manner—that is, the AGV may be controlled by, e.g., (i) an operator utilizing a remote device connected to the AGV via a wired or a wireless connection or (ii) a program (e.g., based on a plurality of instructions implemented as software and run by a processor on the AGV, the plurality of instructions being based on a predetermined schedule or timing of the movement of the part delivery apparatus 100). Some examples of the wireless connection may include a communication via Bluetooth, Wi-Fi, a cellular protocol, vehicle to vehicle (V2V) communications, Zigbee, or any other communications (e.g., wireless) protocol enabled by one or more network access devices capable of communicating via such communications protocol(s). Such network access devices may include, e.g., one or more transceivers on the AGV and a control device (e.g., a user device controlled by an operator).

Figure 1B:
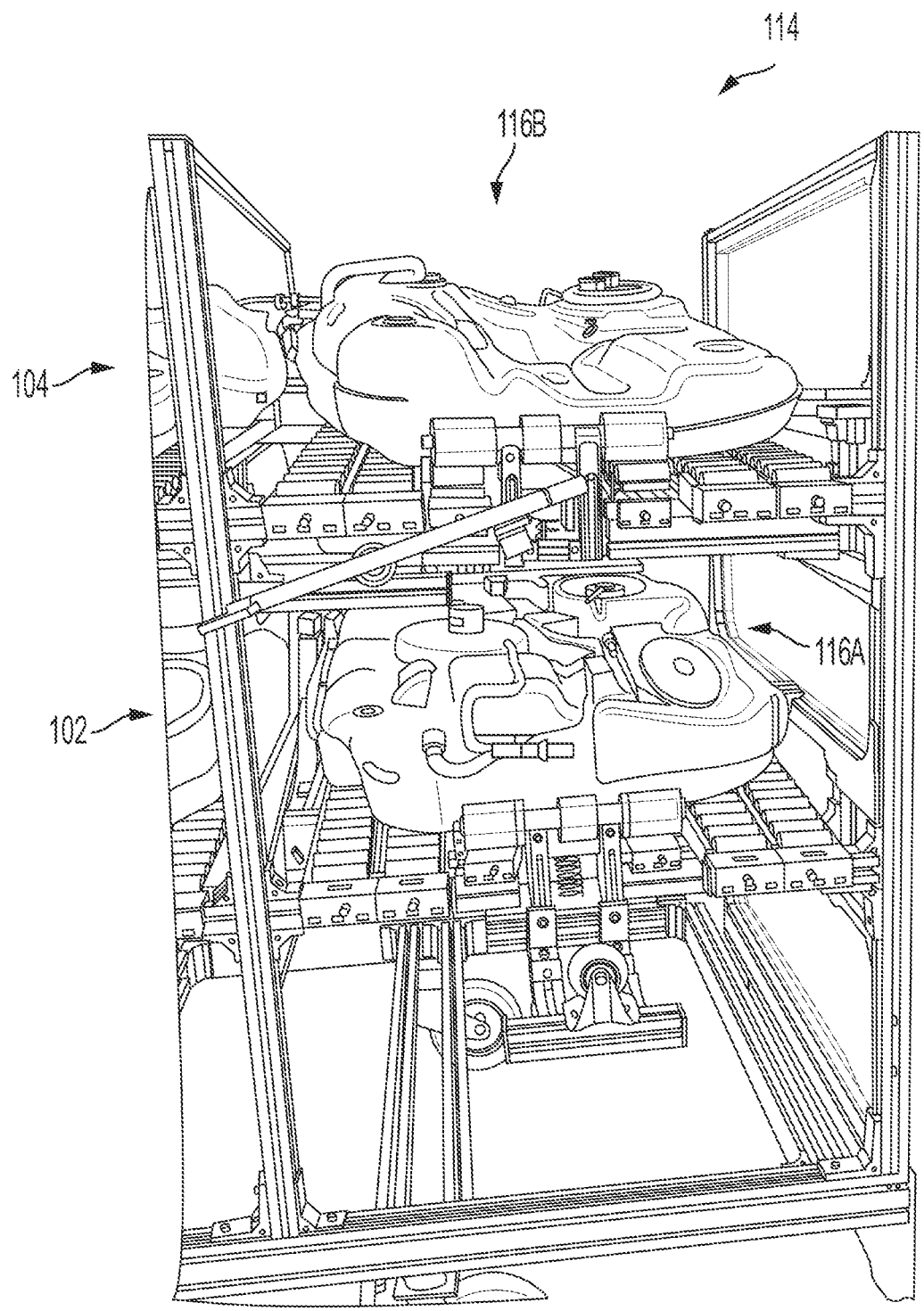
FIG. 1B is an illustration of a portion of an apparatus for delivering a part to another system according to an embodiment of the present invention.

Turning now to FIG. 1B, an example of the holding station group 114 is illustrated. As shown and described further herein, the holding station group 114 includes a first level holding station 102 and a second level holding station 104. Each of the first level holding station 102 and the second level holding station 104 may be configured to receive and hold, respectively, a part 116A and a part 116B. The part 116A and the part 116B may be collectively referred to as the part(s) 116. The part 116A received and held by the first level holding station 102 and the part 116B received and held by the second level holding station 104 may or may not be the same parts (i.e., the same kind or type of parts). As but one example, the part(s) 116 received and held by the first level holding station 102 and/or the second level holding station 104 may be a fuel tank for a vehicle.

Figure 1C:
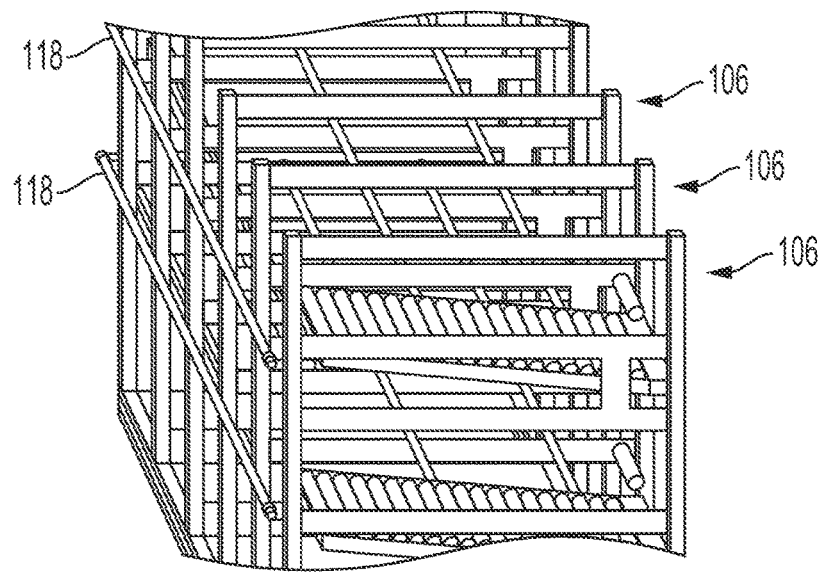
FIG. 1C is an illustration of a portion of a perspective view of an apparatus for delivering a part to another system according to an embodiment of the present invention.

Turning now to FIG. 1C illustrating a portion of a perspective view of the part delivery apparatus 100, the part delivery apparatus 100 may include one or more rear support members 118 each connected to one side (e.g., back side) of a plurality of corresponding level holding stations (e.g., the plurality of first level holding stations 102 or the plurality of second level holding stations 104) at corresponding parts of the plurality of dividers 106. Additional details regarding the one or more rear support members 118 are described herein with respect to FIG. 6.

Figure 1D:
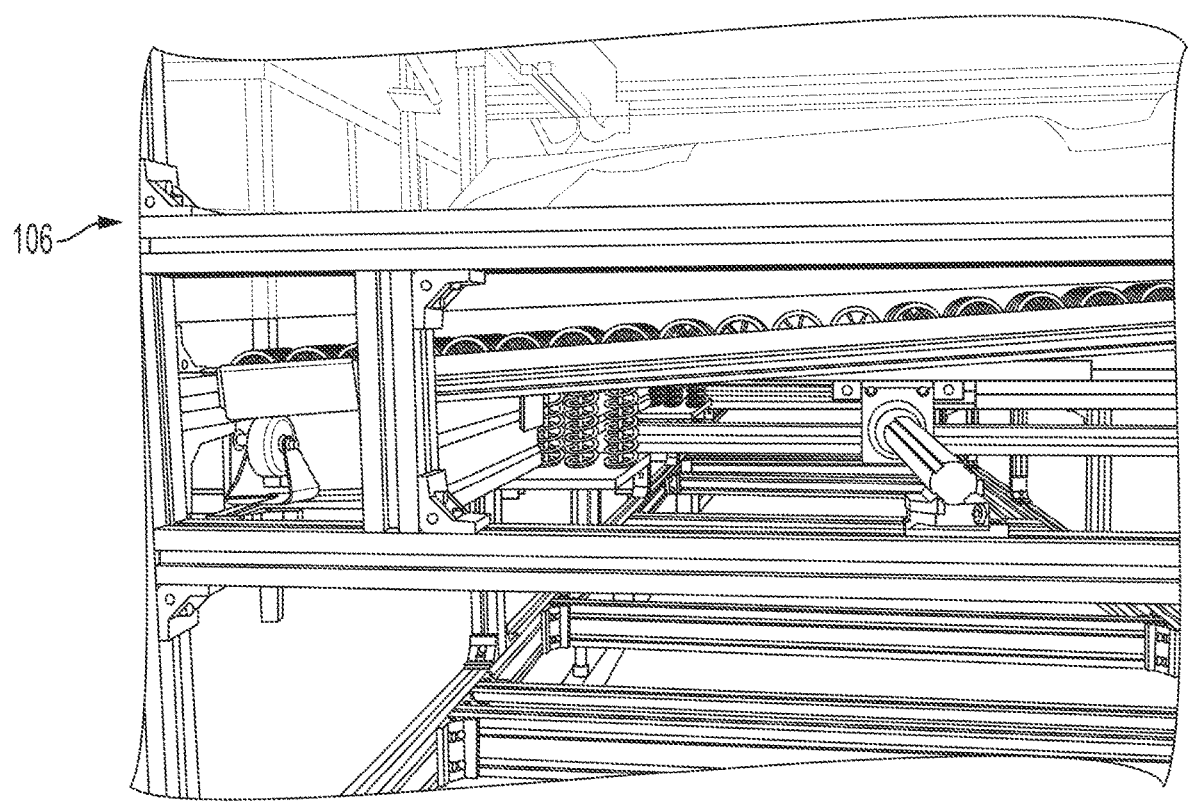
FIG. 1D is an illustration of a portion of a side view of an apparatus for delivering a part to another system according to an embodiment of the present invention.

FIG. 1D is an illustration of a portion of a side view of the part delivery apparatus 100. Each of the plurality of dividers 106 may include one or more panels that are transparent so as to allow an operator to observe the part(s) 116 enclosed in the first level holding station 102 and/or the second level holding station 104. Moreover, the plurality of dividers 106 may each include one or more openings formed by a plurality of frames on each of the plurality of dividers 106 so as to allow physical access (i.e., through the dividers 106) to the inside of the first level holding station 102 and/or the second level holding station 104.

Figure 1E:
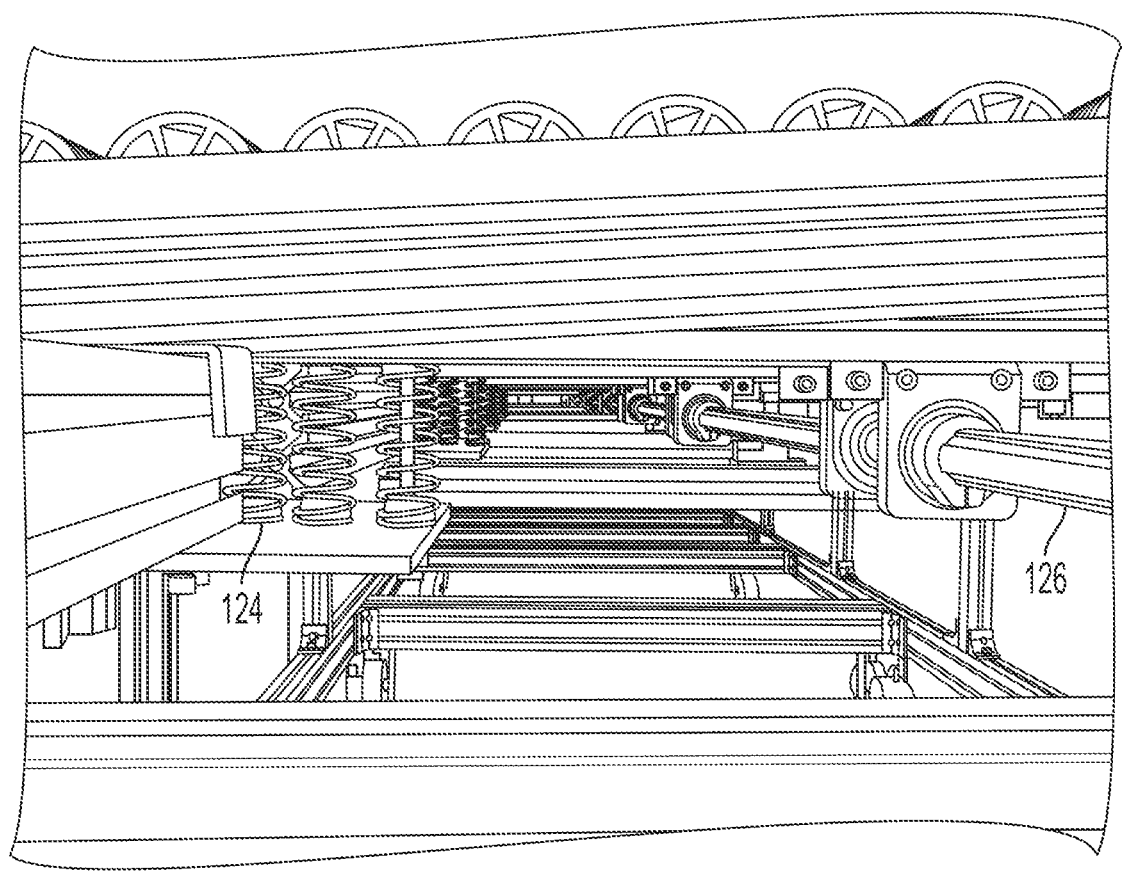
FIG. 1E is an illustration of a portion of a side view of an apparatus for delivering a part to another system according to an embodiment of the present invention.

FIG. 1E is an illustration of a portion of a side view of the part delivery apparatus 100. The part delivery apparatus 100 may include a plurality of springs 124 disposed below a holding station (e.g., the first level holding station 102 or the second level holding station 104). Furthermore, the part delivery apparatus 100 may include a base support member 126 extended across a plurality of holding stations (e.g., the plurality of first level holding stations 102 or the plurality of second level holding stations 104). Additional details regarding the plurality of springs 124 are described herein with respect to FIGS. 2C and 3C, and additional details regarding the base support member 126 are described herein with respect to FIG. 5.

Figure 1F:
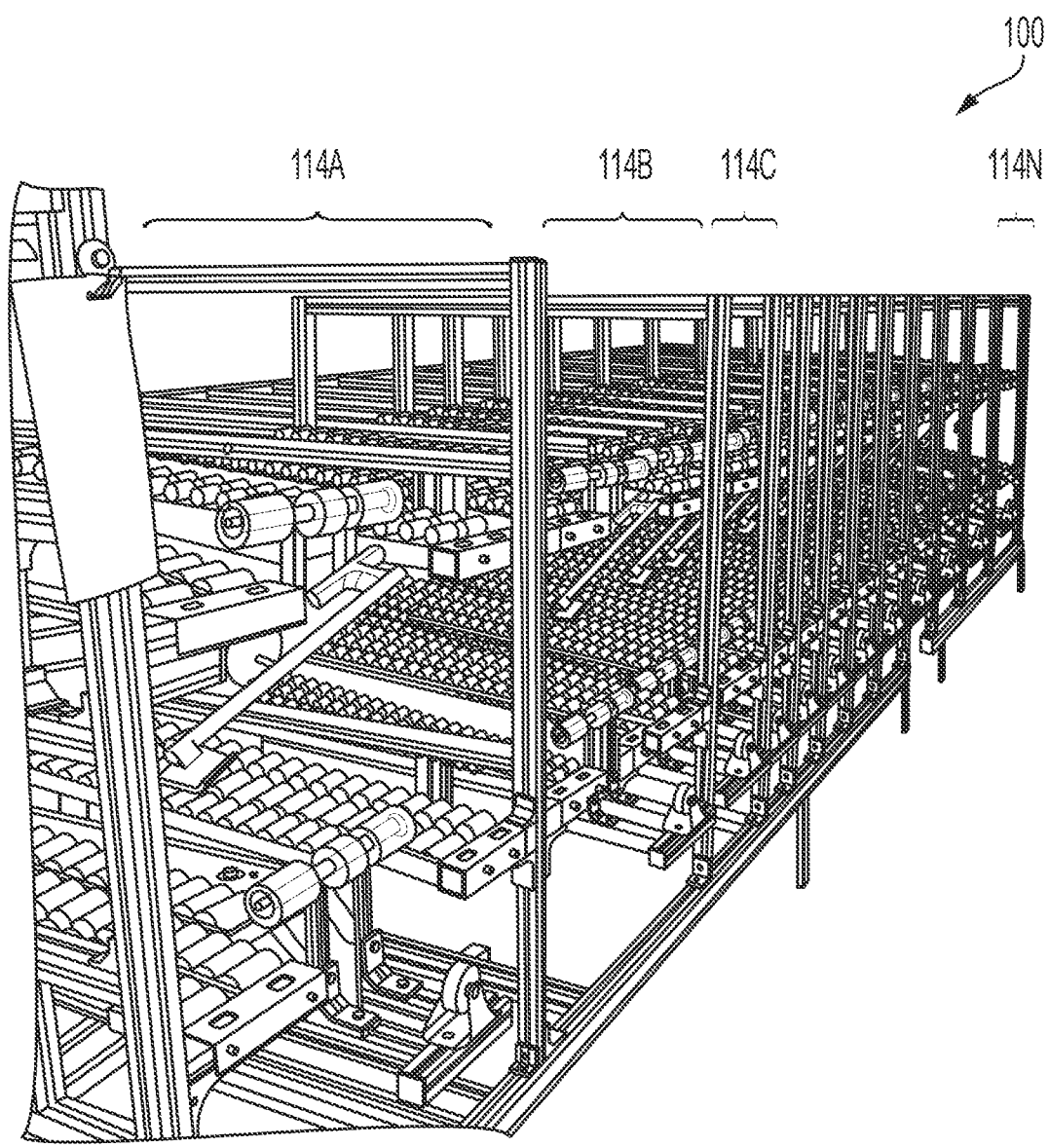
FIG. 1F is an illustration of a perspective view of an apparatus for delivering a part to another system according to an embodiment of the present invention.

FIG. 1F is an illustration of a perspective view of the part delivery apparatus 100. The part delivery apparatus 100 may be moved (e.g., by the AGV as described herein) such that each holding station group 114 may be engaged with another apparatus, system, or device (e.g., a lifter) before a subsequent holding station group 114 engages with the lifter. As but one example, the AGV may be controlled so as to move the part delivery apparatus 100 such that the holding station group disposed at a first end of the part delivery apparatus 100 (a "first" holding station group 114A) is engaged with the lifter and operated on, followed by another holding station group (e.g., the holding station group 114B) disposed immediately next to the holding station group which was just engaged with the lifter and operated on (e.g., the first holding station group 114A), with such process repeated (e.g., on the holding station group 114C, etc.) until the holding station group disposed at an opposite end of the part delivery apparatus 100 (a "last" holding station group 114N) is engaged with the lifter and operated on. The holding station groups 114A-N may be collectively referred to herein as the holding station groups 114. Moreover, the first holding station group operated on may not necessarily be at the first end of the part delivery apparatus 100 (i.e., the first holding station group 114A may be one or more holding station groups away from the first end of the part delivery apparatus 100), and/or the last holding station group 114N may not necessarily be at the opposite end of the part delivery apparatus 100 (i.e., the last holding station group 114N may be one or more holding station groups away from the opposite end of the part delivery apparatus 100). Further, the part delivery apparatus 100 may be moved, e.g., by the AGV as described herein, such that one or more holding station groups 114 which are empty are skipped from being operated on.

Turning now to FIGS. 2A-2E, a first level (e.g., lower level) holding station 200 is illustrated. The first level holding station 200 (e.g., similar to the first level holding station 102) includes a lever 202, a plurality of rollers 204, a first gate member 206, and a first engaging member 228.

As shown in FIG. 2A, the plurality of rollers 204 are disposed over the lever 202. Furthermore, the first gate member 206 includes rollers 208 and 210 connected to one another of the rollers 208 and 210 via a horizontal connecting member 222 fitting through the rollers 208 and 210. The horizontal connecting member 222 may include exposed portions (i.e., not covered by the rollers 208 and 210) that are connected to one or more vertical connecting members 224 for connecting to the lever 202 via one or more connecting portions 212.

The first engaging member 228 includes a wheel 216 on a mounting member 218. The mounting member 218 may be connected to the first gate member 206 via the connecting members 214 and 226. The mounting member 218, the first gate member 206, and the connecting members 214 and 226 may form a single device or may be connected to one another by various bonding techniques known in the art (e.g., welding).

FIG. 2B is an illustration of a front view of a portion of the first level holding station 200 on the part delivery apparatus 100. Particularly, the front view illustrates the first gate member 206 including the rollers 208 and 210, the horizontal connecting member 222, and the vertical connecting members 224 and connected to the lever 202 (having the plurality of rollers 204 disposed over the lever 202) via, e.g., the connecting portions 212, as well as the first engaging member 228 including the wheel 216 on the mounting member 218 connected to the connecting portions 212 via, e.g., the connecting member 226.

FIG. 2C is an illustration of a side view of a portion of the first level holding station 200 on the part delivery apparatus 100. Particularly, the side view illustrates the first gate member 206 including the roller 208 and the vertical connecting members 224 and connected to the lever 202 (having the plurality of rollers 204 disposed over the lever 202) via, e.g., the connecting portions 212, as well as the first engaging member 228 including the wheel 216 on the mounting member 218 connected to the connecting portions 212 via, e.g., the connecting members 214 and 226. Additionally, the side view illustrates a spring 230 (which may include a support bar within) disposed above a support plate 220 (e.g., which may include a hole to allow the support bar through when the spring 230 is compressed).

As described further herein, when the first engaging member 228 is engaged with a first guide member (e.g., guide member 232 shown in FIG. 2F) of another system (e.g., on another apparatus), the first engaging member 228 may be moved so as to move the first gate member 206 to an open position. For example, the first engaging member 228 may be moved downward (i.e., toward the ground) when engaged with the first guide member of another system, causing the first gate member 206, along with the lever 202, to move downward (i.e., toward the ground) and the spring 230 to compress over the support plate 220. As the first engaging member 228 disengages from the first guide member of another system, the spring 230 may decompress, causing the lever 202 to move upward (i.e., away from the ground) and move the first gate member 206 to a closed position. When the first gate member 206 is in the open position, the enclosure of the first level holding station 200 may be exposed such that a part (e.g., the part 116) within the enclosure of the first level holding station 200 may be retrieved through the exposed area (e.g., over the first gate member 206). The retrieval of the part from the enclosure of the first level holding station 200 may be enabled by, at least in part, gravity (causing the part to roll down over the plurality of rollers 204) and/or an operator pulling the part out of the enclosure of the first level holding station 200. When the first gate member 206 is in the closed position, the enclosure of the first level holding station 200 may be blocked by the first gate member 206 such that the part (e.g., the part 116) within the enclosure of the first level holding station 200 may be blocked from, e.g., rolling out of the enclosure of the first level holding station 200.

The lever 202 included in each of the plurality of first level holding stations 200 may be or form a spring-loaded tilt device or tray configured to hold the part (e.g., the part 116) within the enclosure of each first level holding station 200. The first engaging member 228 may be engaged gradually by the first guide member on another apparatus that may push the first engaging member 228 downward (i.e., toward the ground) gradually, hold the first engaging member 228 at its lowest point to hold the first gate member 206 in the open position, and then disengage from the first engaging member 228 gradually to allow the first engaging member 228 to gradually rise (i.e., as the spring 230 decompresses and pushes upward against the lever 202 connected to the first engaging member 228) and cause the first gate member 206 to gradually move to the closed position.

As but one example, such first guide member on another apparatus (which is stationary) may be a "V" shaped member such that the wheel 216 may roll underneath the first guide member from one side to another when the first engaging member 228 is engaged with the first guide member—i.e., as the part delivery apparatus 100 is moved from one side to another as described herein and the first engaging member 228 (e.g., the wheel 216) engages the first guide member from one side to another, the first engaging member 228 (including the wheel 216) may be pushed downward until the wheel 216 rolling in contact with and underneath the first guide member reaches the lowest point of the first guide member (e.g., the trough of the "V") and then released back upward as the wheel 216 rolling in contact with and underneath the first guide member reaches the other side of the first guide member.

Each first level holding station 200 may have multiple sets (e.g., six (6) sets) of rollers 204 forming an inclined surface on which the part (e.g., the part 116) may rest while being held within the enclosure of the first level holding station 200. The inclined (i.e., tilted) surface having the rollers 204 may allow the part to roll down over the rollers 204 due to gravity. Furthermore, the lever 202 (or the tilt device or tray) may be connected to and/or disposed underneath some or all sets of the rollers 204. Moreover, the spring 230 may be more than a single spring (e.g., three (3) compression springs) that are connected to a plate (e.g., made of steel) and/or a tray (e.g., made of aluminum) (i.e., of or connected to the lever 202). Further, the spring(s) 230 may also have a stopper (e.g., a nylon stopper) to hold the spring(s) 230 in place. The spring 230 (or at least one spring such as, e.g., the "back" spring of the multiple springs 230 which is farthest from the first gate member 206) may have a bolt going through the spring 230 and a stopper (e.g., a rubber stopper) to eliminate bouncing effect when the lever 202 (i.e., the tilt device or tray) comes back up (i.e., away from the ground) as the first guide member on another apparatus disengages from the first engaging member 228. Furthermore, the tilt device or tray (e.g., of or connected to the lever 202) may have one or more rotating bearings (see, e.g., one or more mounting parts 502 described herein with respect to FIG. 5) that allow the tilt device or tray to pivot on a stationary bar (see, e.g., a base support bar 504 described herein with respect to FIG. 5) that spans an entire length of the part delivery apparatus 100—allowing multiple tilt devices or trays along each level of part holding stations on the part delivery apparatus 100.

Figure 2D:
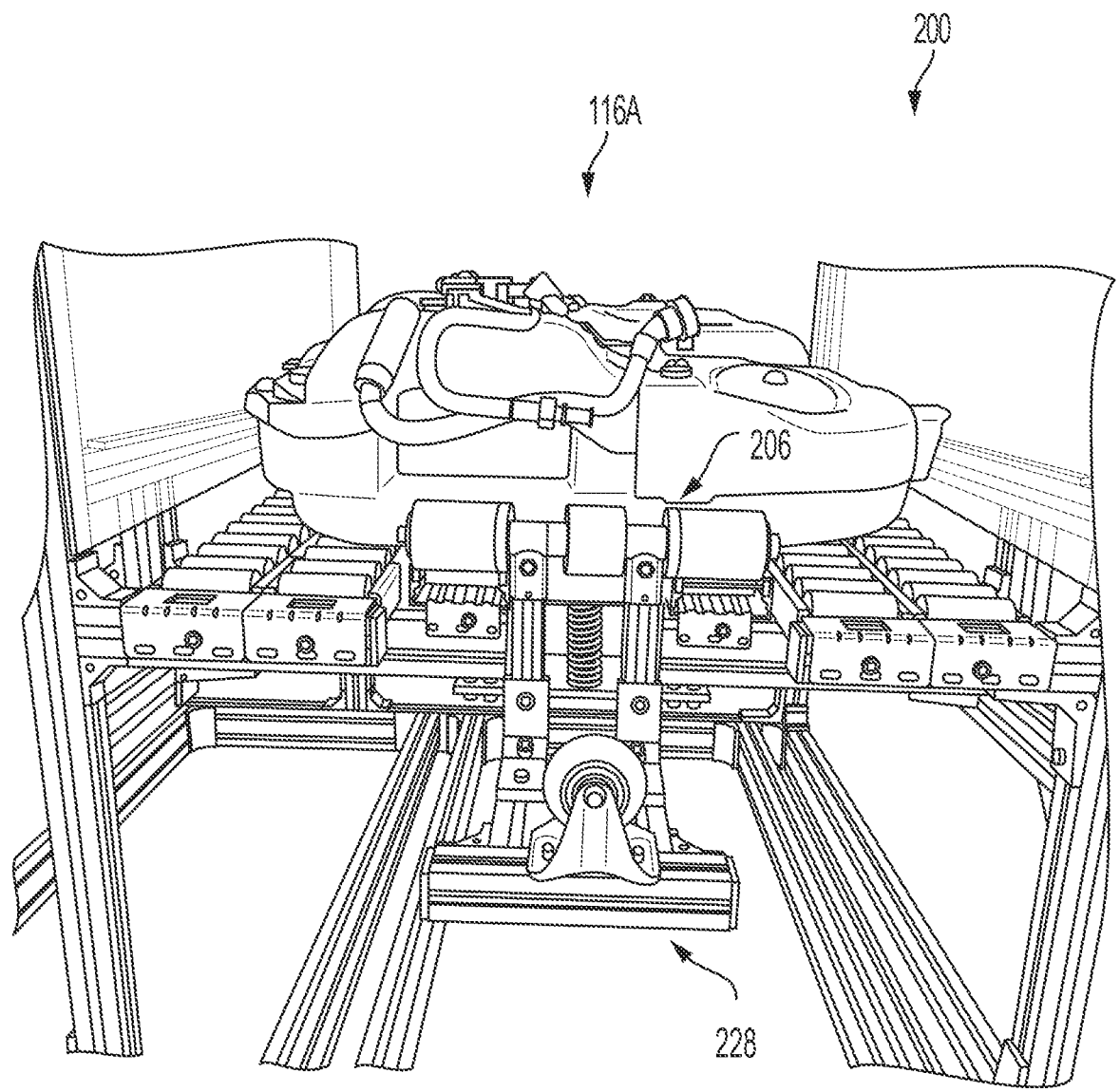
FIG. 2D is an illustration of a portion of a front view of a part holding station on an apparatus for delivering a part to another system according to an embodiment of the present invention.

FIG. 2D is an illustration of a front view of a portion of the first level holding station 200 on the part delivery apparatus 100. As shown, the first gate member 206 (connected to the first engaging member 228) is in the closed position, blocking the part 116A (e.g., a fuel tank) within the enclosure of the first level holding station 200 from rolling out of the enclosure of the first level holding station 200.

Figure 2E:
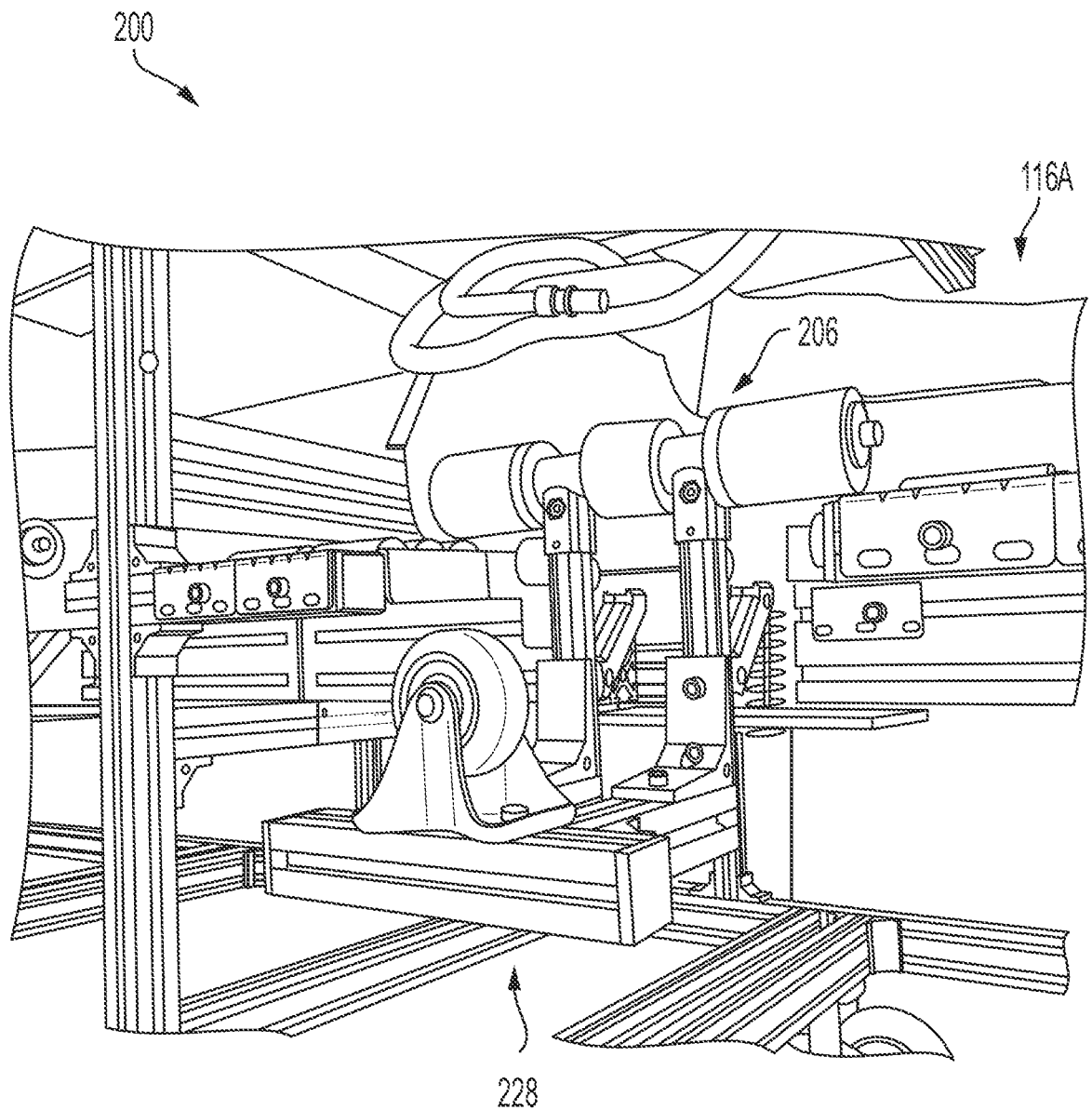
FIGS. 2E and 2F are an illustration of a portion of a perspective view of a part holding station on an apparatus for delivering a part to another system according to an embodiment of the present invention.
Figure 2F:
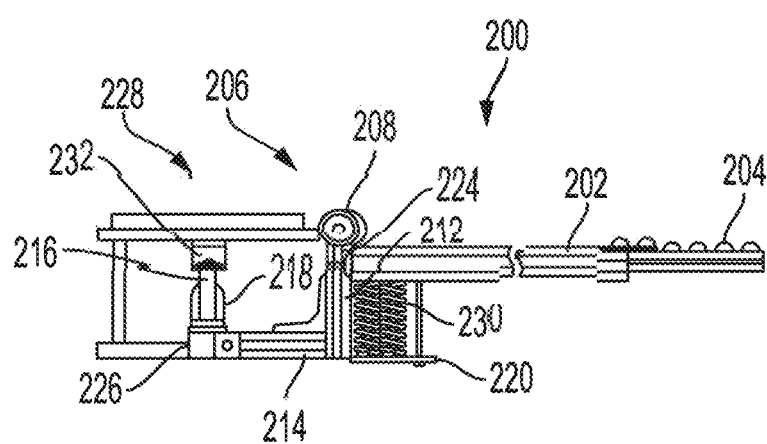

FIG. 2E is an illustration of a portion of a perspective view of the first level holding station 200 on the part delivery apparatus 100. As shown, the first gate member 206 (connected to the first engaging member 228) is in the closed position, blocking the part 116A (e.g., a fuel tank) within the enclosure of the first level holding station 200 from rolling out of the enclosure of the first level holding station 200.

Figure 3D:
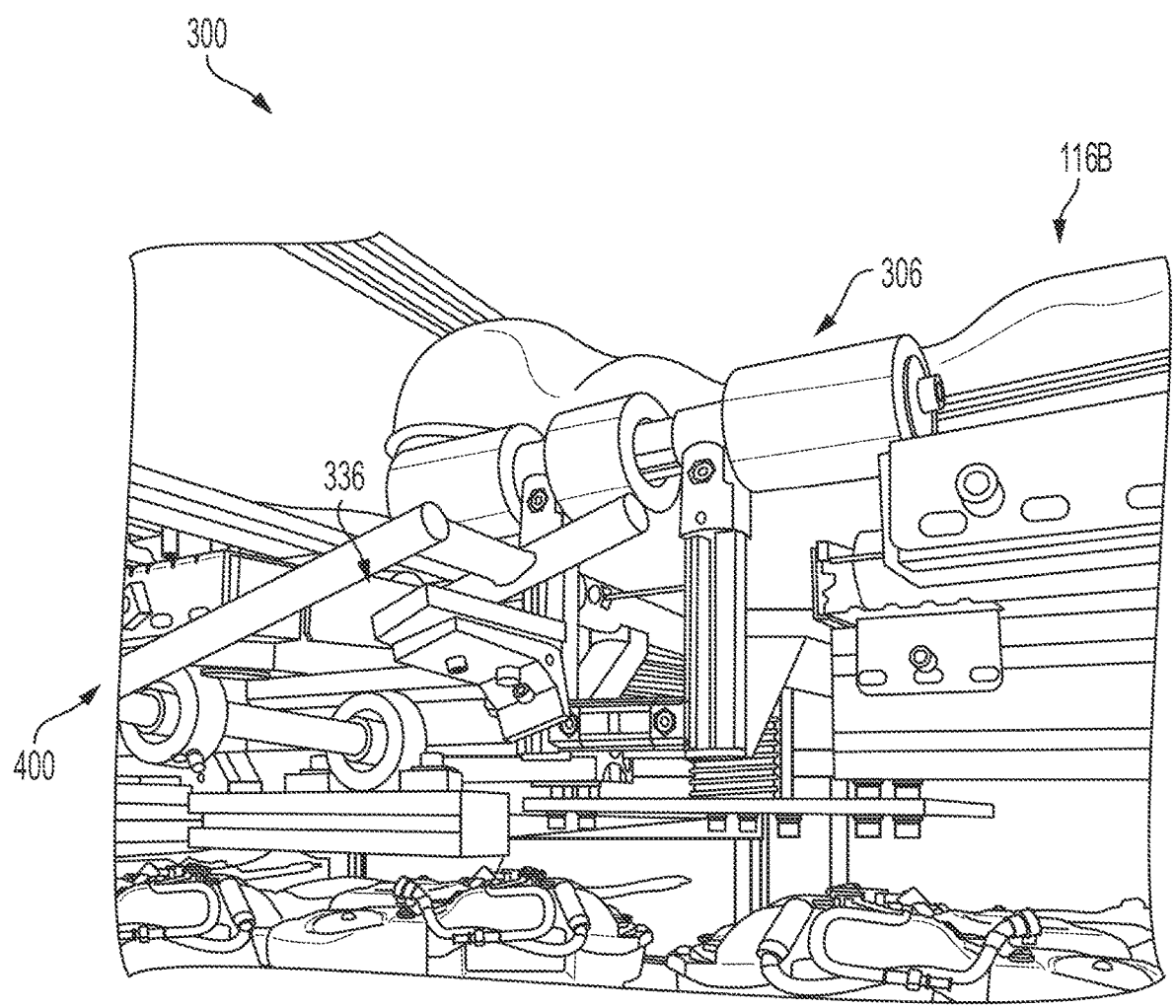
FIG. 3D is an illustration of a portion of a perspective view of a part holding station on an apparatus for delivering a part to another system according to an embodiment of the present invention.

Turning now to FIGS. 3A-3D, a second level (e.g., upper level) holding station 300 is illustrated. The second level holding station 300 (e.g., similar to the second level holding station 104) includes a lever 302, a plurality of rollers 304, a second gate member 306, and a second engaging member 336. Similarly as described (at least in part) herein regarding the first level holding station 200 with respect to FIGS. 2A-2C, FIG. 3A is an illustration of a perspective view of a portion of the second level holding station 300 on the part delivery apparatus 100, FIG. 3B is an illustration of a front view of a portion of the second level holding station 300 on the part delivery apparatus 100, and FIG. 3C is an illustration of a side view of a portion of the second level holding station 300 on the part delivery apparatus 100. That is, the second level holding station 300 may include similar components as described herein with respect to FIGS. 2A-2C, such as, e.g., the lever 302 (similar to the lever 202), the plurality of rollers 304 (similar to the plurality of rollers 204), the second gate member 306 (similar to the first gate member 206), rollers 308 and 310 (similar to the rollers 208 and 210), one or more connecting portions 312 (similar to the one or more connecting portions 212), a support plate 320 (similar to the support plate 220), a horizontal connecting member 322 (similar to the horizontal connecting member 222), one or more vertical connecting members 324 (similar to the one or more vertical connecting members 224), and a spring 330 (similar to the spring 230). These components on the second level holding station 300 may be similar to and function similarly as the corresponding components on the first level holding station 200 as described herein, e.g., with respect to at least FIGS. 2A-2C.

The second engaging member 336 may include a first portion 332 configured for engaging (directly or indirectly) with a second guide member (e.g., guide member 232 shown in FIG. 2F) of another system (e.g., on another apparatus) and a second portion 334 for connecting to the second gate member 306 via the connecting portions 312. As described further herein, when the second engaging member 336 is engaged with the second guide member of another system, the second engaging member 336 may be moved so as to move the second gate member 306 to an open position. For example, the second engaging member 336 may be moved downward (i.e., toward the ground) when engaged with the second guide member of another system, causing the second gate member 306, along with the lever 302, to move downward (i.e., toward the ground) and the spring 330 to compress over the support plate 320. As the second engaging member 336 disengages from the second guide member of another system, the spring 330 may decompress, causing the lever 302 to move upward (i.e., away from the ground) and move the second gate member 306 to a closed position. When the second gate member 306 is in the open position, the enclosure of the second level holding station 300 may be exposed such that a part (e.g., the part 116B) within the enclosure of the second level holding station 300 may be retrieved through the exposed area (e.g., over the second gate member 306). The retrieval of the part from the enclosure of the second level holding station 300 may be enabled by, at least in part, gravity (causing the part to roll down over the plurality of rollers 304) and/or an operator pulling the part out of the enclosure of the second level holding station 300. When the second gate member 306 is in the closed position, the enclosure of the second level holding station 300 may be blocked by the second gate member 306 such that the part (e.g., the part 116B) within the enclosure of the second level holding station 300 may be blocked from, e.g., rolling out of the enclosure of the second level holding station 300.

FIG. 3D is an illustration of a portion of a perspective view of the second level holding station 300 on the part delivery apparatus 100. As shown, the second gate member 306 (connected to the second engaging member 336) may be in the closed position, blocking the part 116B (e.g., a fuel tank) within the enclosure of the second level holding station 300 from rolling out of the enclosure of the second level holding station 300. Also shown in FIG. 3D is an engaging bar 400 described further herein with respect to FIGS. 4A and 4B. The engaging bar 400 may be utilized for the engagement between the second engaging member 336 and the second guide member of another system.

Figure 4A:
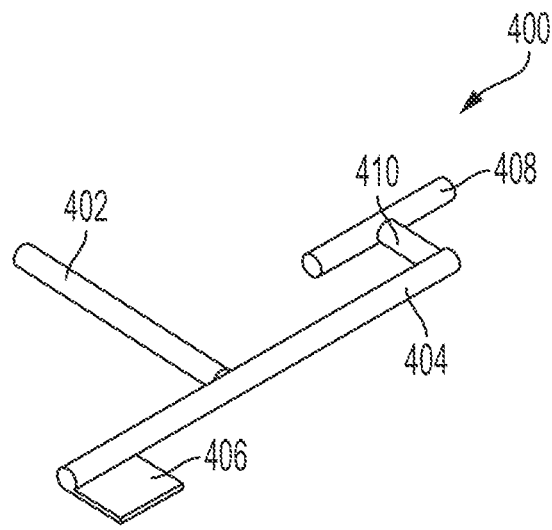
FIG. 4A is an illustration of a perspective view of a portion of an engaging member on an apparatus for delivering a part to another system according to an embodiment of the present invention.

FIG. 4A is an illustration of a perspective view of the engaging bar 400. The engaging bar 400 includes a rotating bar 404, a first engaging portion 406, a second engaging portion 408, and a connecting part 410. The engaging bar 400 may connect to a part holding station on the part delivery apparatus 100 (e.g., the second level holding station 104, 300) via a connecting bar 402. For example, the connecting bar 402 may be (i) rotatably connected to the part holding station (or another part of the part delivery apparatus 100) and fixedly connected to the rotating bar 404 or (ii) fixedly connected to the part holding station (or another part of the part delivery apparatus 100) and rotatably connected to the rotating bar 404, such that the engaging bar 400 may rotate around an axis perpendicular to the rotating bar 404 and parallel to the connecting bar 402. The first engaging portion 406 may be coupled to a first end of the rotating bar 404, and the second engaging portion 408 may be coupled (via the connecting part 410) to a second end (i.e., opposite the first end) of the rotating bar 404.

The first engaging portion 406 may have various shapes (e.g., a flat rectangular plate, etc.) and may be engaged by a guide member of another system (e.g., on another apparatus) when, e.g., the guide member of another system is raised upward (i.e., away from the ground and toward the first engaging portion 406). As the guide member of another system is raised, the guide member of another system may contact the first engaging portion 406 on a side of the first engaging portion 406 facing the ground, causing the first engaging portion 406 to rise upward (i.e., away from the ground) and causing the engaging bar 400 to rotate. As the engaging bar 400 is rotated, the second engaging portion 408 may contact an engaging member on a part holding station (e.g., the second engaging member 336 on the second level holding station 300—particularly, the first portion 332—described herein with respect to FIGS. 3A-3D) and cause the engaging member on the part holding station (e.g., the second engaging member 336 on the second level holding station 300) to move downward (i.e., toward the ground). The first portion 332 of the second engaging member 336 may include a stopper (e.g., a nylon stopper) for contacting the second engaging portion 408.

As described herein with respect to FIGS. 3A-3D, when the second engaging member 336 on the second level holding station 300 is moved downward, the second gate member 306 may be moved to the open position. As the guide member of another system disengages from the engaging bar 400 (i.e., the first engaging portion 406) in the scenario described above, the second gate member 306 on the second level holding station 300 may be moved to the closed position as the spring 330 decompresses and pushes the lever 302 and the second gate member 306 upward (i.e., away from the ground).

Figure 4B:
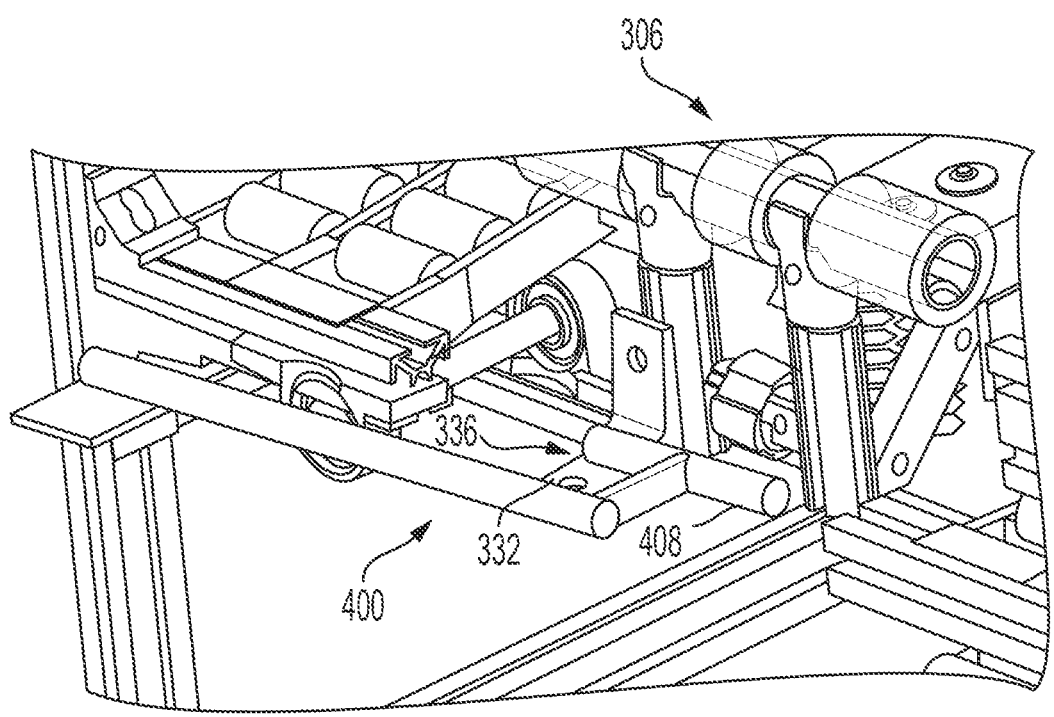
FIG. 4B is an illustration of a perspective view of an engaging member on an apparatus for delivering a part to another system according to an embodiment of the present invention.

FIG. 4B is an illustration of a perspective view of the engaging bar 400 connected to, e.g., the second level holding station 300 on the part delivery apparatus 100. As shown, the second engaging portion 408 of the engaging bar 400 may contact the first portion 332 of the second engaging member 336 on the second level holding station 300 (i.e., when the engaging bar 400 is engaged by the guide member of another system) and cause the second gate member 306 and the lever 302 to be pushed downward.

Figure 5:
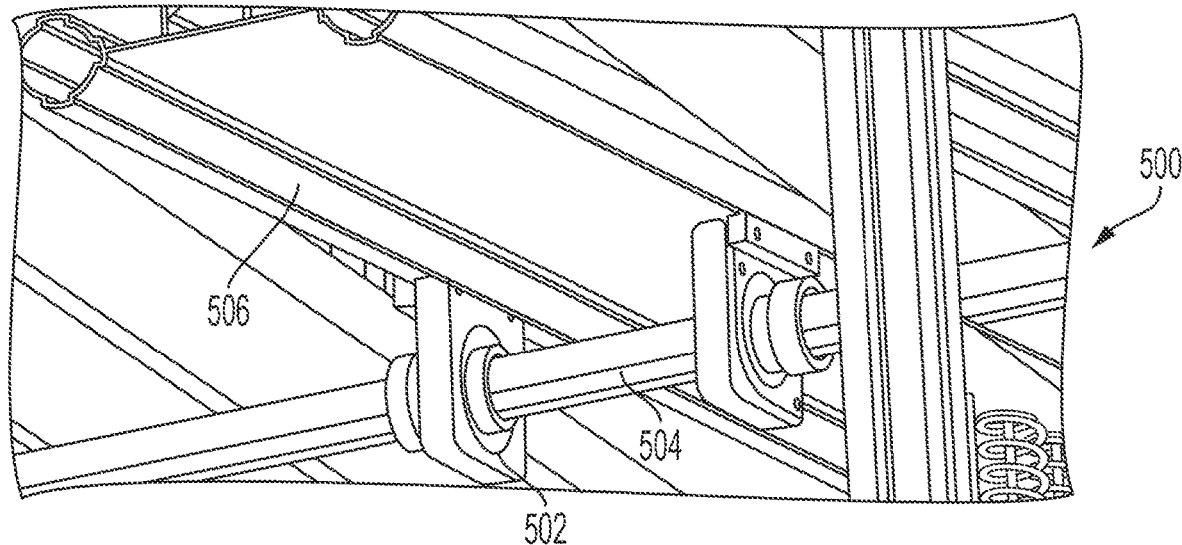
FIG. 5 is an illustration of a perspective view of a portion of a base support member on an apparatus for delivering a part to another system according to an embodiment of the present invention.

FIG. 5 is an illustration of a portion of a base support member 500 (similar to the base support member 126) on the part delivery apparatus 100. The base support member 500 includes a base support bar 504 spanning across the plurality of part holding stations (e.g., the plurality of first level holding stations 102 or the plurality of second level holding stations 104) and through one or more mounting parts 502 attached to a frame 506 of the part delivery apparatus 100. The base support member 500 may provide further stability and integrity of the part delivery apparatus 100 by providing a base support to the plurality of part holding stations (e.g., the plurality of first level holding stations 102 and the plurality of second level holding stations 104). Moreover, as described herein, the mounting parts 502 may be or include rotating bearings to allow the lever 202, 302 (e.g., having or connected to the frame 506) to pivot on the base support bar 504.

Figure 6:
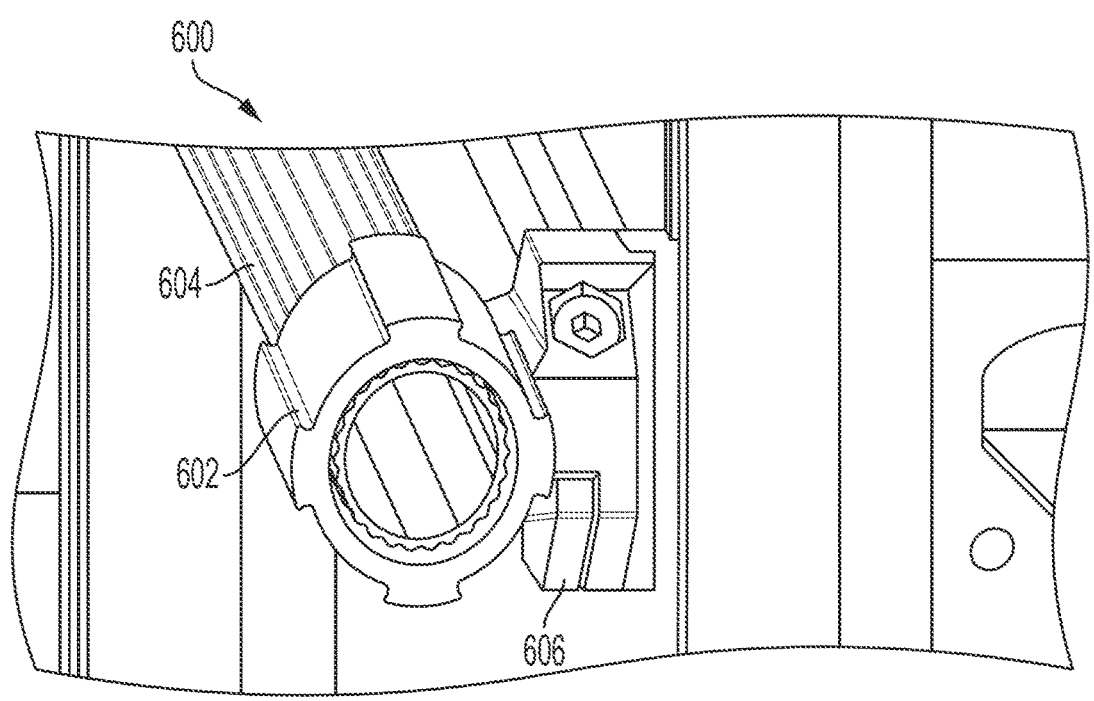
FIG. 6 is an illustration of a perspective view of a portion of a rear support member on an apparatus for delivering a part to another system according to an embodiment of the present invention.

FIG. 6 is an illustration of a portion of a rear support member 600 (similar to the one or more rear support members 118) on the part delivery apparatus 100. The rear support member 600 includes a rear support bar 604 spanning across the plurality of part holding stations (e.g., the plurality of first level holding stations 102 or the plurality of second level holding stations 104) and through one or more mounting parts 602 attached to a frame 606 of the part delivery apparatus 100. The rear support member 600 may provide further stability and integrity of the part delivery apparatus 100 by providing a rear support to the plurality of part holding stations (e.g., the plurality of first level holding stations 102 and the plurality of second level holding stations 104)—preventing the parts (e.g., the parts 116)

within the plurality of part holding stations from dropping out of the plurality of part holding stations from the rear side of the part delivery apparatus 100.

Figure 7:
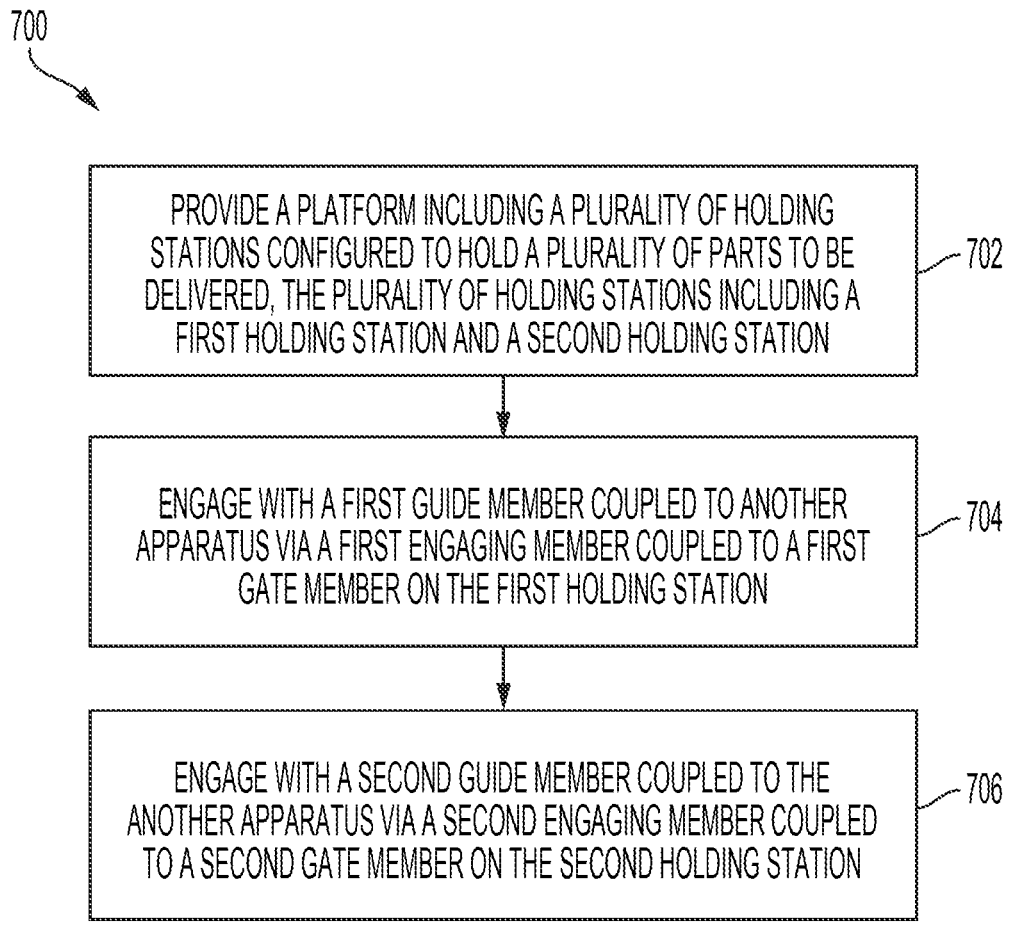
FIG. 7 is a flowchart illustrating a method for delivering a part to another system according to an embodiment of the present invention.

Turning now to FIG. 7, a flowchart illustrating a method 700 for delivering a part to another apparatus or system is described.

In step 702, the method 700 includes providing a platform including a plurality of holding stations configured to hold a plurality of parts to be delivered (e.g., to another system). As described herein, the plurality of holding stations include at least a first holding station configured to hold a first part and a second holding station configured to hold a second part.

Providing the platform including the plurality of holding stations may include providing (i) a plurality of first level holding stations including the first holding station and (ii) a plurality of second level holding stations including the second holding station, wherein each one of the plurality of first level holding stations is disposed underneath a respective one of the plurality of second level holding stations.

Each holding station of the plurality of holding stations may include a plurality of rollers forming an inclined plane to enable a respective part of the plurality of parts to move down the plurality of rollers (e.g., due to gravity).

In step 704, the method 700 includes engaging with a first guide member coupled to another apparatus (e.g., of another system) via a first engaging member coupled to a first gate member on the first holding station. As described herein, the first gate member may be configured to move to an open position and release the first part in response to the first engaging member being engaged with the first guide member on another apparatus.

In step 706, the method 700 includes engaging with a second guide member coupled to another apparatus (e.g., of another system) via a second engaging member coupled to a second gate member on the second holding station. As described herein, the second gate member may be configured to move to an open position and release the second part in response to the second engaging member being engaged with the second guide member on another apparatus.

As described herein, the first engaging member may include a wheel. Moreover, the second engaging member may include (i) a first portion configured to engage with the second guide member on another apparatus and (ii) a second portion connected to the first portion at a 90° angle and connected to the second gate member.

Furthermore, each gate member of the first gate member and the second gate member may be configured to move to a closed position after a respective part of the first part and the second part is released.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for delivering a part to another system, the apparatus comprising:
 a platform including a plurality of holding stations configured to hold a plurality of parts to be delivered to another system, the plurality of holding stations including at least a first holding station configured to hold a first part and a second holding station configured to hold a second part;
 a first gate member coupled to the first holding station and a first engaging member coupled to a first spring and configured to engage with a first guide member coupled to another apparatus, the first gate member being configured to move to an open position and release the first part when the first engaging member is engaged with the first guide member on the another apparatus, the first engaging member configured to move downward to the open position causing the first spring to compress; and
 a second gate member coupled to the second holding station and a second engaging member coupled to a second spring and configured to engage with a second guide member coupled to the another apparatus, the second gate member being configured to move to an open position and release the second part when the second engaging member is engaged with the second guide member on the another apparatus, the second engaging member configured to move downward to the open position causing the second spring to compress.

2. The apparatus of claim 1, wherein the plurality of holding stations include (i) a plurality of first level holding stations including the first holding station and (ii) a plurality of second level holding stations including the second holding station, wherein each one of the plurality of first level holding stations is disposed underneath a respective one of the plurality of second level holding stations.

3. The apparatus of claim 1, wherein each holding station of the plurality of holding stations includes a plurality of rollers forming an inclined plane to enable a respective part of the plurality of parts to move down the plurality of rollers.

4. The apparatus of claim 1, wherein the first engaging member includes a wheel.

5. The apparatus of claim 1, wherein the second engaging member includes (i) a first portion configured to engage with the second guide member on the another apparatus and (ii) a second portion connected to the first portion at a 90° angle and connected to the second gate member.

6. The apparatus of claim 1, wherein each gate member of the first gate member and the second gate member is configured to move to a closed position after a respective part of the first part and the second part is released.

7. The apparatus of claim 1, further comprising a connector configured to couple to an automated guide vehicle (AGV), and
 wherein the apparatus is configured to be moved by the AGV.

8. A system for delivering a part to another system, the system comprising:
 a platform including a plurality of holding stations configured to hold a plurality of parts to be delivered to another system, the plurality of holding stations including at least a first holding station configured to hold a first part and a second holding station configured to hold a second part;
 a first gate member coupled to the first holding station and a first engaging member coupled to a first spring and configured to engage with a first guide member coupled to another apparatus, the first gate member being configured to move to an open position and release the first part when the first engaging member is engaged with the first guide member on the another apparatus, the first engaging member configured to move downward to the open position causing the first spring to compress; and a second gate member coupled to the second holding station and a second engaging member coupled to a second spring and configured to engage with a second guide member coupled to the another apparatus, the second gate member being configured to move to an open position and release the second part when the second engaging member is engaged with the second guide member on the another apparatus, the second engaging member configured to move downward to the open position causing the second spring to compress.

9. The system of claim 8, wherein the plurality of holding stations include (i) a plurality of first level holding stations including the first holding station and (ii) a plurality of second level holding stations including the second holding station, wherein each one of the plurality of first level holding stations is disposed underneath a respective one of the plurality of second level holding stations.

10. The system of claim 8, wherein each holding station of the plurality of holding stations includes a plurality of rollers forming an inclined plane to enable a respective part of the plurality of parts to move down the plurality of rollers.

11. The system of claim 8, wherein the first engaging member includes a wheel.

12. The system of claim 8, wherein the second engaging member includes (i) a first portion configured to engage with the second guide member on the another apparatus and (ii) a second portion connected to the first portion at a 90° angle and connected to the second gate member.

13. The system of claim 8, wherein each gate member of the first gate member and the second gate member is configured to move to a closed position after a respective part of the first part and the second part is released.

14. The system of claim 8, further comprising a connector configured to couple to an automated guide vehicle (AGV), and wherein the apparatus is configured to be moved by the AGV.

15. A method for delivering a part from an apparatus to another apparatus, the method comprising:

providing a platform including a plurality of holding stations configured to hold a plurality of parts to be delivered to another system, the plurality of holding stations including at least a first holding station configured to hold a first part and a second holding station configured to hold a second part;

engaging, via a first engaging member coupled to a first spring, with a first guide member coupled to another apparatus, the first engaging member coupled to a first gate member connected to the first holding station, the first gate member being configured to move to an open position and release the first part in response to the first engaging member being engaged with the first guide member on the another apparatus, the first engaging member configured to move downward to the open position causing the first spring to compress; and engaging, via a second engaging member coupled to a second spring, with a second guide member coupled to the another apparatus, the second engaging member coupled to a second gate member connected to the second holding station, the second gate member being configured to move to an open position and release the second part in response to the second engaging member being engaged with the second guide member on the another apparatus, the second engaging member configured to move downward to the open position causing the second spring to compress.

16. The method of claim 15, wherein providing the platform including the plurality of holding stations includes providing (i) a plurality of first level holding stations including the first holding station and (ii) a plurality of second level holding stations including the second holding station, wherein each one of the plurality of first level holding stations is disposed underneath a respective one of the plurality of second level holding stations.

17. The method of claim 15, wherein each holding station of the plurality of holding stations includes a plurality of rollers forming an inclined plane to enable a respective part of the plurality of parts to move down the plurality of rollers.

18. The method of claim 15, wherein the first engaging member includes a wheel.

19. The method of claim 15, wherein the second engaging member includes (i) a first portion configured to engage with the second guide member on the another apparatus and (ii) a second portion connected to the first portion at a 90° angle and connected to the second gate member.

20. The method of claim 15, wherein each gate member of the first gate member and the second gate member is configured to move to a closed position after a respective part of the first part and the second part is released.

* * * * *